UNITED STATES PATENT OFFICE.

THOMAS J. LOVETT, OF CHICAGO, ILLINOIS, ASSIGNOR TO THE ALLERTON LUBRICANT COMPANY, OF SAME PLACE.

METHOD OF MAKING A LUBRICANT.

SPECIFICATION forming part of Letters Patent No. 548,376, dated October 22, 1895.

Application filed March 21, 1895. Serial No. 542,696. (No specimens.)

*To all whom it may concern:*

Be it known that I, THOMAS J. LOVETT, a citizen of the United States, residing at Chicago, in the county of Cook and State of Illinois, have invented a new and useful Improvement in Methods of Forming a Lubricating Compound, of which the following is a specification.

My object is to provide a particularly durable and effective lubricating compound for shafting, machinery-bearings, and vehicle-axles generally.

The principal ingredients of my improved lubricant are mica, preferably of the common form known as "Muscovite," and lubricating-oil.

As provided for use, lubricating compounds of the class to which my invention belongs are in a plastic state and known to the trade as "axle-grease." The requirements of an axle-grease are that the ingredients shall be closely intermixed and stable in the sense of being combined in such a manner that under climatic changes the plastic condition will not vary and none of the ingredients will precipitate or otherwise separate themselves from the mass. Mica and oil alone will not blend or become so closely and permanently intermixed as to produce axle-grease which will remain of the proper consistency throughout, because the mica, being of greater specific gravity than the oil, will separate from the oil and settle to the bottom.

My invention consists in combining with oil and with mica (in a more or less pulverulent state) slaked lime and resin-oil in a manner and in proportions which, without detracting from the lubricating qualities of the oil and mica, will fix the oil and mica in a closely-intermixed plastic state, which will not be affected by climatic changes.

In carrying out my invention I provide the ingredients named in proportions substantially as follows for each one hundred pounds of axle-grease: twenty-five pounds of mica, eight gallons of oil, ten pounds of lime, and ten pounds of resin-oil.

The mica is first flaked and freed of every particle of grit, after which it is pulverized. The oil I employ is preferably unrefined petroleum, because it is comparatively inexpensive and being a mineral product the affinity between it and the mica is greater than is the case with animal or vegetable oils. The lime is dry-slaked, so as to be comparatively free from moisture, and is finely pulverized and thoroughly screened to free it from all gritty substance.

To carry out my method of compounding the lubricant, the mica, lime, and petroleum are placed in a vessel and raised to a temperature exceeding in degree any climatic changes—say 130° Fahrenheit—and stirred constantly until thoroughly mixed, after which the resin-oil is added and stirred into the mixture. The lime is a basis or mordant, and when acted upon by the resin-oil the mixture becomes set or fixed, so that as the mass is permitted to cool it assumes a plastic state of the consistency of ordinary axle-grease and will remain in that condition under all climatic changes.

By means of special machinery and appliances which I have devised for the purpose I am enabled to pulverize the mica and eliminate therefrom all gritty substances at a very low cost. For lubricating machinery-bearings and other purposes where a high-class lubricant is necessary, I reduce the mica to, or approximately to, an impalpable powder. For bearings of a more or less rough nature having inequalities or fissures on their surfaces an axle-grease made with a coarser quality of mica may be employed, the laminiferous properties of the latter causing it to fill up fissures or other defects in the bearing-surfaces and smoothing them over.

The large proportion of mica which I employ renders the lubricant comparatively incombustible and overcomes the danger of fire from hot journal-boxes. The mica also renders the axle-grease practically everlasting, and when dust-proof housings or journal-boxes are employed to prevent access of gritty substances to the axle-grease the latter may remain indefinitely without renewal. While I have obtained the best results by employing the ingredients named in substantially the relative proportions above set forth, those proportions may be varied and still afford a desirable and effective lubricant.

While resin-oil is not devoid of lubricating properties I do not class it among the lubricating-oils, which, with the mica, would form the basis or body of my improved lubricating compound.

What I claim as new, and desire to secure by Letters Patent, is—

The method of forming a lubricating compound which consists in intimately mixing together granular or pulverulent mica, lubricating-oil and lime, raising the temperature of the mixture to a degree in excess of climatic changes, and then adding resin-oil, substantially as described.

THOMAS J. LOVETT.

In presence of—
 M. J. FROST,
 J. H. LEE.